United States Patent [19]

Kurokawa et al.

[11] Patent Number: 6,084,736
[45] Date of Patent: Jul. 4, 2000

[54] READING DEVICE FOR READING IDENTIFICATION INFORMATION OF A CARTRIDGE STORING RECORDING MEDIUM, RECORDING/REPLAYING APPARATUS USING THE SAME, AND INFORMATION MANAGING APPARATUS

[75] Inventors: Toshiya Kurokawa; Masahiro Kodama; Yasuaki Kano; Kyoichi Isomura; Taketoshi Yamagishi; Yoshitsugu Taki, all of Kanagawa, Japan

[73] Assignee: Sony Corporation, Tokyo, Japan

[21] Appl. No.: 08/992,992

[22] Filed: Dec. 18, 1997

[30] Foreign Application Priority Data

Dec. 19, 1996 [JP] Japan .................................. 8-354468

[51] Int. Cl.⁷ .................................................. G11B 15/68
[52] U.S. Cl. .............................................. 360/71; 360/92
[58] Field of Search .............................. 360/69, 71, 92, 360/132, 137; 369/34, 58

[56] References Cited

U.S. PATENT DOCUMENTS

| | | |
|---|---|---|
| 5,587,849 | 12/1996 | Kori et al. ............................... 360/69 |
| 5,631,784 | 5/1997 | Suzuki et al. ............................ 360/69 |
| 5,819,309 | 10/1998 | Gray ..................................... 360/134 X |
| 5,822,145 | 10/1998 | Nishida et al. .......................... 360/69 |
| 5,867,335 | 2/1999 | Ozue et al. .............................. 360/71 |
| 5,907,444 | 5/1999 | Oguro ..................................... 360/69 |

*Primary Examiner*—Paul Loomis
*Assistant Examiner*—James L Habermehl
*Attorney, Agent, or Firm*—Jay H. Maioli

[57] ABSTRACT

A reading device for reading identification information of cartridges comprises a judging circuit for judging whether the cartridge has an identification information storer for storing the identification information of a recording medium thereof, and an information reader for reading the identification information of the identification information storer. This judgment is made before the information reader reads the identification information of the identification information storer, and the information reader reads the identification information only in the event that the cartridge has an identification information storer. Accordingly, waste of time and labor are spared for reading the identification information, and trouble such as deterioration and damage from to attempting to read the identification information from storage medium cartridges which do not have the identification information storers can be prevented. Consequently, reading of identification information of the recording medium cartridges can be performed efficiently.

7 Claims, 8 Drawing Sheets

READING DEVICE FOR READING IDENTIFICATION INFORMATION OF A CARTRIDGE STORING RECORDING MEDIUM, RECORDING/REPLAYING APPARATUS USING THE SAME, AND INFORMATION MANAGING APPARATUS

BACKGROUND OF THE INVENTION

1. Field of the Invention

The present invention relates to a reading device for reading identification information distinguishing a cartridge storing a recording medium and a recording/replaying apparatus using the reading device, and also relates to an information managing apparatus storing a plurality of cartridges for replaying or recording from or to according to commands from an external command device.

2. Description of the Related Art

Recording mediums for computer systems include magnetic disks (hard disks, flexible disks, etc.), magnetic tape, and so forth. There are known information managing apparatuses which manage great amounts of information by comprising a plurality of drive units of recording medium such as described above, regarding which a great amount of information is recorded to and replayed from.

For example, with information managing apparatuses which use magnetic tape as the recording medium (hereafter referred to as "tape library devices"), a plurality of tape cassettes having magnetic tape stored within are stored in predetermined racks, and a desired tape is extracted therefrom by means of a transporting mechanism and mounted to a certain tape drive unit of which there are a plurality, thereby enabling recording/replaying of the tape information.

The control means within the tape library apparatus exchanges information with external command apparatuses such as a host computer, and the tape library apparatus provides the information required by the external command apparatus replayed from the magnetic tape via the tape drive unit or records certain information to the magnetic tape thereby, thus managing the information.

Now, with such equipment, in the event that the number or types of tape cassettes having the magnetic tape increases to a certain extent, there arises the need to provide the cassette tapes with identification information for identifying the tape cassette (e.g., the title of the tape cassette, type or format of tape, etc.), in addition to the information recorded to the magnetic tape of each tape cassette, i.e., the need to manage the tape cassettes.

In order to deal with this need, there can be conceived an arrangement wherein the above identification information is recorded to some sort of storage means which is then either stored within the tape cassette or provided to the exterior of the tape cassette, allowing the identification information of the tape cassette to be read by the reading means provided to the tape drive unit within the apparatus.

However, the above method is problematic in that each tape cassette must be loaded to a tape drive unit and read in order to find out the tape cassette identification information.

Further, even in the event that a certain tape cassette does not have such storage means, there is the problem that this must also be mounted to the tape drive unit and read, consuming unnecessary time and energy on the identification information reading process. Increased frequency of use of the reading device can lead to reduced life expectancy of the device. Also, in the event that the apparatus attempts to read identification information from a tape cassette which does not have such identification information, this may result in deterioration or damage to the reading means.

SUMMARY OF THE INVENTION

Accordingly, it is an object of the present invention to effectively read cartridge identification information.

It is a further object of the present invention to prevent deterioration or damage to the reading means by preventing a non-stipulated cartridge from being loaded to the identification information reading means.

In order to solve the above problems, the present invention is arranged such that judging means judges whether or not the recording medium cartridge has said identification information storing means, this judgment being made partway through a path before reaching the information reading means, and the information reading means reads the identification information only in the event that the cartridge has identification information storing means therefrom.

Thus, according to the present invention, judgment can be made whether or not the cartridge has such identification information storing means before the information reading means reads the identification information of the identification information storing means.

DESCRIPTION OF THE PREFERRED EMBODIMENT

Figure 1:
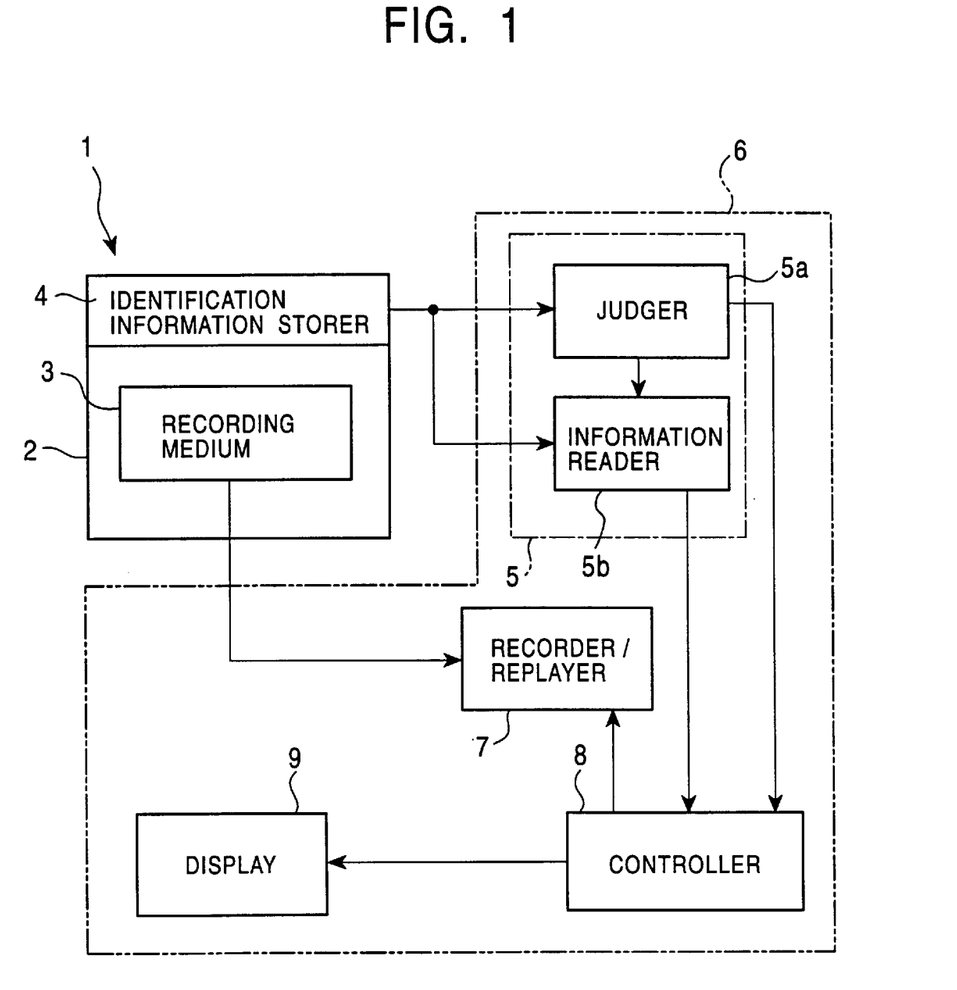
FIG. 1 is a conceptual diagram representation of the cartridge identification information reading device and recording/replaying apparatus according to the present invention.

FIG. 1 is a conceptual representation of the reading device according to the present invention and the recording/replaying apparatus using the reading device, wherein a recording medium 3 is stored within the casing 2 of a cartridge 1. This recording medium 3 encompasses mediums following any and all recording methods, such as magnetic recording, optical-magnetic recording, etc., and the form thereof encompasses all types, and is by no means restricted to disks, tapes, memory cards, and the like.

There are two types of cartridges 1. These which are provided with identification information storing means 4 which store identification information for distinguishing the recording medium 3, and those which are not provided with identification information storing means 4.

Various types of identification information are provided for the recording medium 3, such as the title of the contents, type or format of the recording medium, the recording method, etc. Also, there are two ways of providing the identification information. One wherein the identification is displayed on the outer surface of the casing, and one wherein the identification is provided on the inside of the casing. Examples of the former include: geometrical representations such as bar-code information and so forth; code representations such as characters, symbols, numerals, etc.; and so forth. An example of the latter includes: an arrangement wherein a non-volatile memory circuit is provided within the casing, to which identification information is stored allowing for reduction in size and conservation of space. In the event that the identification information is provided on the outer surface of the casing 2, frequent usage of the cartridge can cause deterioration on the information displayed thereon, so it is preferable from a perspective of maintaining the identification information long-term to provide the identification information storer 4 within the casing.

Examples of the method of reading the identification information include optical, magnetic (including optical-magnetic), contact, and so forth.

Although the identification information storer 4 can be provided as a portion of the recording medium 3 (e.g., recording the identification information to a certain area of the recording area of the recording medium), such an arrangement necessitates the identification information to be read by means for replaying the information of the recording medium 3, and accordingly, the identification information storer 4 and the recording medium 3 should be provided separately in order to facilitate easy reading of only the identification information.

The recorder 5 is comprised of a judger 5a which judges whether or not the cartridge 1 has an identification information storer 4, and information reader 5b for reading the identification information of the identification information storer 4.

The judger 5a judges whether or not the cartridge 1 has the identification information storer 4 partway through the path before the information reader 5b reads the identification information of the identification information storer 4, so that the information reader 5b reads the identification information of the identification information storer .4 only in the event that the cartridge 1 has the identification information storer 4. Accordingly, identification information is not read from cartridges which do not have the identification information storer 4, and accordingly, time and energy is not wasted. Further, the frequency of use of the information reader 5b is lowered, and the information reader 5b is also protected from deterioration and damage.

The following examples can be given as methods for judging whether not the cartridge 1 has an identification information storer 4.

(I) A method wherein the presence or absence of the identification information storer is displayed on the cartridge casing.

(II) A method wherein the presence or absence of the identification information storer is judged from the form thereof.

First, (I) comprises a method wherein the presence or absence of the identification information storer 4 is indicated on the casing 2 of the cartridge 1, either by form-related characteristics of the casing, or by a visual display. Examples of these include: displaying presence or absence of the identification information storer by recesses, notches, holes, etc. formed in the cartridge casing; displaying presence or absence of the identification information storer by applying labels or other displaying materials to the cartridge to indicate the status; and so forth.

Also, (II) comprises a method wherein the presence or absence of the identification information storer 4 is judged from the unique characteristics thereof, e.g., in the event that the identification information storer is a memory circuit and a terminal of the memory circuit is exposed from the casing, detecting for the presence of the electrodes allows for judging of the presence or absence of the identification information storer. Incidentally, it is preferable that a non-contact detecting method be used for detecting the characteristic portion of the identification information storer, from a perspective of protecting the identification information storer and extending the life expectancy thereof.

A recording/replaying device 6 has a recorder/replayer 7 which records information to and replays information from the recording medium 3, in addition to the aforementioned judger 5a and information reader 5b. For example, in the event that the recording medium 3 is magnetic tape or a magnetic disk, the recorder/replayer 7 comprises a drive device which has a magnetic head. Incidentally, the recording/replaying device 6 encompasses devices which only perform replaying or recording of the recording medium 3, and devices which perform both replaying and recording.

Regarding the recording/replaying device 6, first, the judger 5a judges whether or not the cartridge 1 has the identification information storer 4 partway through the path before the information reader 5b reads the identification information of the identification information storer 4. Then, the information reader 5b reads the identification information of the identification information storer 4 only in the event that the cartridge 1 has the identification information storer 4, and the recorder/replayer 7 performs recording or replaying of the cartridge 1.

Now, it is preferable that this reading of identification information by the information reader 5b be conducted before the recorder/replayer 7 performs recording or replaying of the recording medium 3 of the cartridge 1. This is because that such an arrangement allows for reading of the identification information to be performed in an easier and quicker manner than general recording and replaying of recording mediums, and in addition, it is not effective from a perspective of managing identification information to read identification information after time-consuming recording or replaying of the recording medium.

Also, in the event that the cartridge does not have any identification information, there is the possibility that the cartridge may not meet the storage format of the recording/replaying device, and unnecessary trouble can be avoided by ejecting the cartridge in such cases.

In order to realize such, a controller 8 for controlling the operation of the recorder/replayer 7 is provided, and in the event that the cartridge 1 has an identification information storer 4, recording or replaying of the recording medium in the cartridge is performed according to commands sent from the controller 8 to the recorder/replayer 7. Consequently, in the event that the cartridge does not have an identification information storer, the cartridge is ejected from the device according to commands sent from the controller 8 to the recorder/replayer 7.

Judgment of whether or not the cartridge 1 has the identification information storer 4 may be performed based on judging signals sent from the judger 5a to the controller 8 as shown in FIG. 1, or may be performed indirectly based on the presence or absence of reading results of the identification information sent from the information reader 5b to the controller 8.

Also, in the event that the cartridge does not have any identification information, it is effective to notify the user of the recording/replaying device 6 of such by making a display to that end. In the event that the user understands beforehand that the cartridge is an object of use by the recorder/replayer 7 even though it does not have identification information, there are cases in which the intention of the user should be respected and use of the cartridge be permitted.

In this case, a display 9 is provided. The judger 5a judges whether or not the cartridge 1 has the identification information storer 4 partway through the path before the information reader 5b reads the identification information of the identification information storer 4. In the event that the cartridge 1 has the identification information storer 4, recording to or replaying from the recording medium is performed according to commands sent from the controller 8 to the recorder/replayer 7. In the event that the cartridge 1 does not have the identification information storer 4, display is made on the display 9 according to commands sent from the controller 8 to the display 9 to the effect that the cartridge 1 does not have the identification information storer 4. This displaying encompasses various forms, such as only performing an error display, making a confirmation display regarding whether or not the cartridge is an object of use, displaying a message confirming the intent of the user, and so forth.

Next, description will be made regarding an information managing apparatus for using the above-described cartridge 1 to manage a great amount of information.

Figure 2:
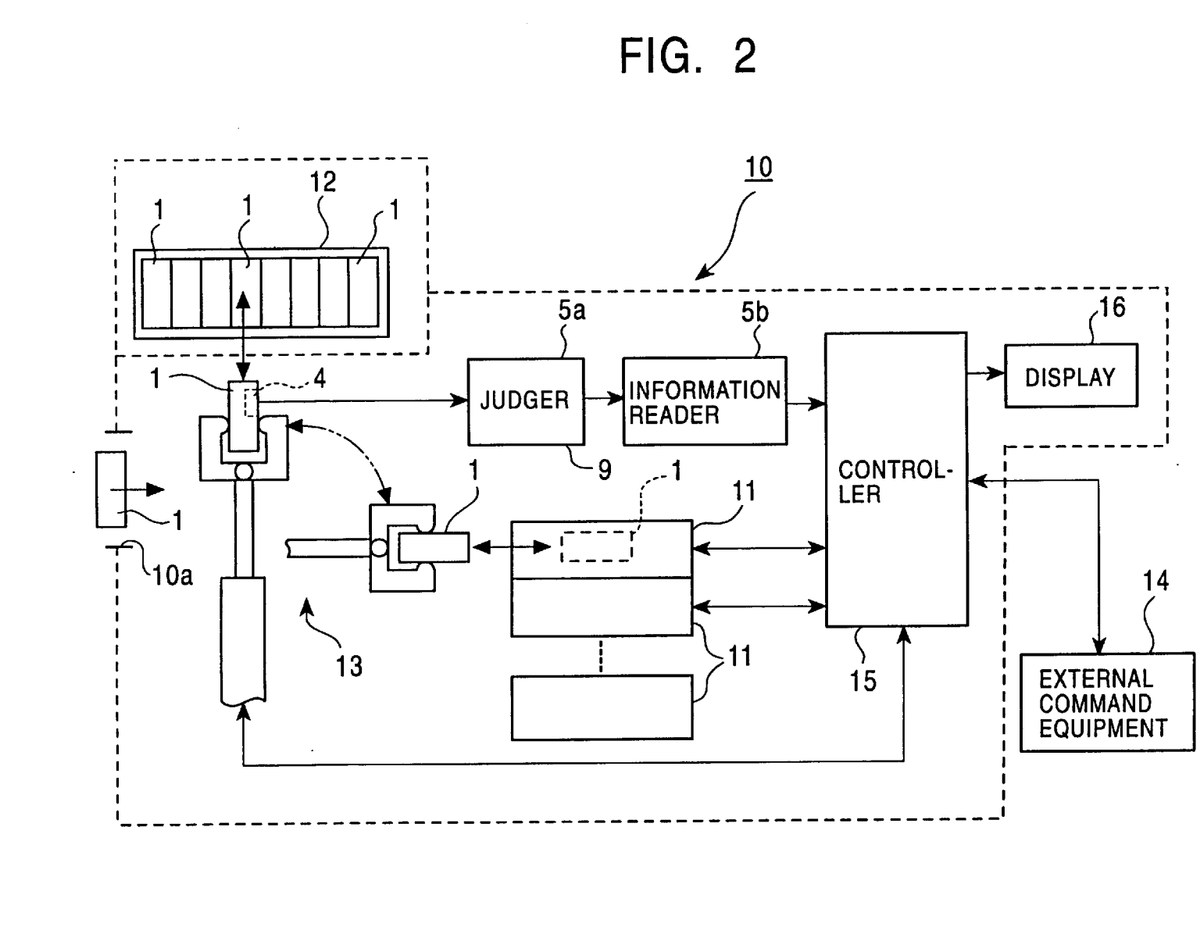
FIG. 2 is a diagram illustrating the configuration of the information managing apparatus according to the present invention.

FIG. 2 illustrates the configuration of an information managing apparatus 10 comprising, in addition to the above-described judger 5a and information reader 5b, recording/replaying means 11, 11, . . . for recording to or replaying from the recording medium 3 of the cartridge 1, a storage portion 12 for storing a plurality of cartridges 1, 1, . . . , and transporting means 13 for transporting the desired cartridge from the storage portion 12 and transporting this cartridge to the recording/replaying means 11, 11, . . . .

The information managing apparatus 10 replays from the recording medium 3 of the cartridge 1 information requested by commands from an external command device 14 such as a host computer, and provides this information to the external command device 14, or records information to the recording medium 3 of the cartridge 1 according to commands from the external command device 14, thus serving as an information center.

Then, the judger 5a judges whether or not the cartridge 1 has the identification information storer 4 partway through the path before the information reader 5b reads the identification information of the identification information storer 4. Only in the event that the cartridge has the identification information storer 4, the information reader 5b reads the identification information of the identification information storer 4, and also recording or replaying of the cartridge transported by the transporting means 13 to the recording/replaying means 11 is performed.

A controller 15 serving as a control center is provided within the information managing apparatus 10, whereby control is performed of the recording/replaying means 11, 11, . . . , transporting means 13, and so forth. Also, the recording medium 3 of the cartridge 1 is managed by the reading signals sent from the information reader 5b to the controller 15.

Also, in the case of storing an unregistered cartridge of which identification information has not yet been identified in the storage portion 12, the cartridge 1 is inserted through an insertion opening 10a provided in the apparatus, following which judgment is made regarding whether or not the cartridge 1 has an identification information storer 4 before replaying or recording with recording medium 3 of the cartridge 1, and in the event that the cartridge 1 has an identification information storer, this is also read before the replaying or recording. Such an arrangement depends on reading of the identification information being speedy and management of the identification information being easy.

Also, in the event that the recording medium cartridge does not have identification information, there is the possibility that the recording medium of the cartridge does not meet the recording format of the recording/replaying means, so it is preferable that the cartridge be ejected form the apparatus, or a display made that the cartridge does not have identification information, in order to avoid unnecessary trouble.

That is to say, the operation of the recording/replaying means 11 and transporting means 13 are controlled by the above-described controller 15, and also, the judger 5a judges whether or not the cartridge has the identification information storer 4 partway through the path before the information reader 5b reads the identification information of the identification information storer 4. In the event that the cartridge has the identification information storer 4, recording to or replaying from the recording medium of the cartridge is performed according to commands sent from the controller 15 to the recording/replaying means 11. In the event that the cartridge does not have the identification information storer, the cartridge is ejected from the apparatus, according to commands sent from the controller 15 to the recording/replaying means 11.

Or, in another arrangement, a display 16 is provided, and the judger 5a judges whether or not the cartridge 1 has the identification information storer 4 partway through the path before the information reader 5b reads the identification information of the identification information storer 4. In the event that the cartridge has the identification information storer 4, recording to or replaying from the recording medium of the cartridge is performed according to commands sent from the controller 15 to the recording/replaying means 11. In the event that the cartridge does not have the identification information storer, display is made on the display 16 to the effect that the cartridge does not have an identification information storer, according to commands sent from the controller 15 to the display 16.

The information managing apparatus 10 stores a plurality of cartridges 1, 1, . . . in the storage portion 12 thereof, and it is preferable that the storage method thereof be such that the storage location of the cartridges be distinguished according to whether the cartridges do or do not have an identification information storer 4.

Figure 3:
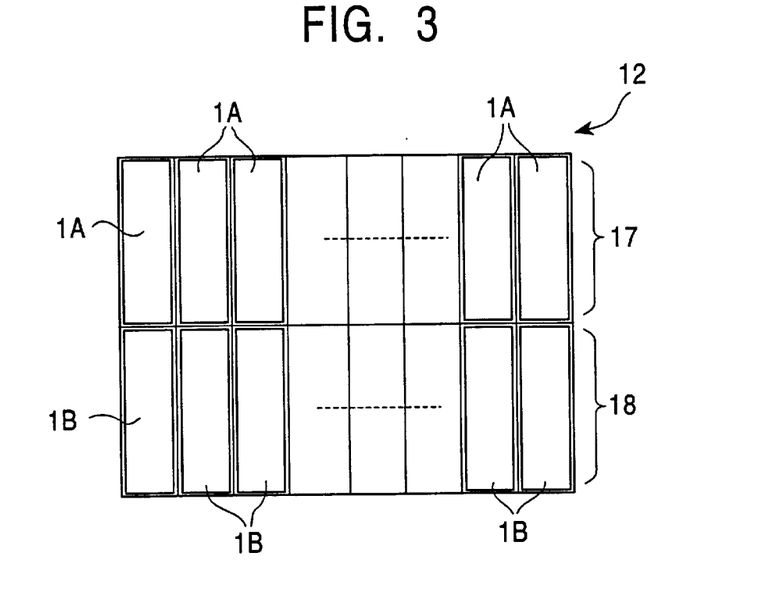
FIG. 3 is an explanatory diagram for distinguishing storage location according to presence or absence of identification information storage means.

For example, as shown in FIG. 3, a cartridge storing portion 12 is constructed so as to comprise a first storage portion 17 which only stores cartridges 1A, 1A, . . . which have an identification information storer 4, and a second storage portion 18 which only stores cartridges 1B, 1B, . . . which do not have an identification information storer 4.

Then, the judger 5a judges whether or not the cartridge 1 has the identification information storer 4 partway through the path before the information reader 5b reads the identification information of the identification information storer 4. In the event that the cartridge 1 has the identification information storer 4 the transporting means 13 transports the cartridge to the aforementioned first storage portion 17 and stores the cartridge therein, and in the event that the cartridge does not have the identification information storer 4 the transporting means 13 transports the cartridge to the aforementioned second storage portion 18 and stores the cartridge therein, thus arranging the cartridges.

The reason why the cartridges are separated in the storage locations thereof depending on whether or not they have an identification information storer 4 is that it is more effective to store cartridges which do not have an identification information storer 4 in a certain area and eject these later at one time, rather than ejecting the cartridges each time one is found not to have the identification information storer 4. Ejecting the cartridges stored in the second storage portion 18 can be performed manually, or can be performed by the transporting means 13.

Figure 4:
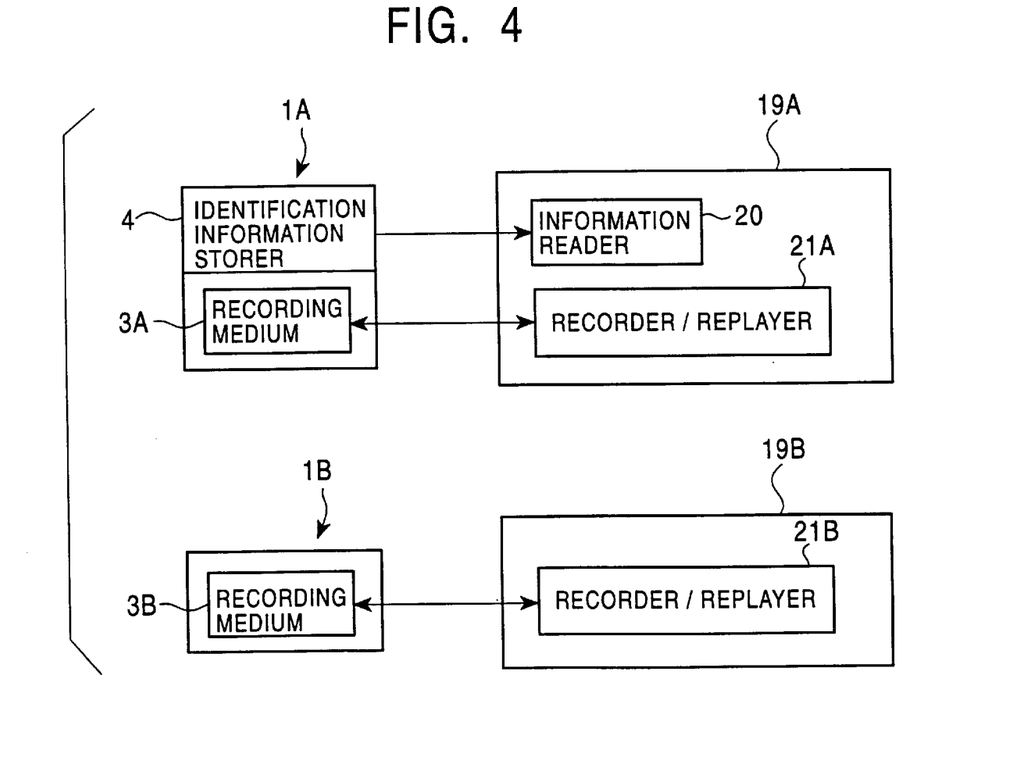
FIG. 4 is an explanatory diagram regarding selection of recording/replaying means according to presence or absence of identification information storage means.

It is preferable that two types of recording/replaying means are provided for the recording/replaying means 11 within the information managing apparatus 10, for the cartridges which have the identification information storers 4 and those which do not.

That is to say, as shown in FIG. 4, first recording/replaying means 19A for performing recording or replaying of the cartridge 1A which has an identification information storer 4, and second recording/replaying means 19B for performing recording or replaying of the cartridge 1B which does not have an identification information storer 4, are provided. Information reading means 20 and a recorder/replayer 21A are provided to the first recording/replaying means 19A, and a recorder/replayer 21B is provided to the second recording/replaying means 19B.

The recorder/replayer 21A is constructed to perform recording or replaying of information according to the recording format of the recording medium 3A of the cartridge 1A, and the recorder/replayer 21B is constructed to perform recording or replaying of information according to the recording format of the recording medium 3B of the cartridge 1B, so that these must be distinguished by the aforementioned judger 5a upon performing recording or replaying of the cartridges 1A and 1B.

Regarding an information managing apparatus 10 having two types of recording/replaying means 19A and 19B, the judger 5a judges whether or not the cartridge 1 has the identification information storer 4 partway through the path before the information reading means 20 of the recording/replaying means 19A reads the identification information of the identification information storer 4. In the event that the cartridge has the identification information storer 4 the transporting means 13 transports the cartridge to the aforementioned first recording/replaying means 19A, and in the event that the cartridge does not have the identification information storer 4 the transporting means 13 transports the cartridge to the aforementioned second recording/replaying means 19B.

Thus, cartridges can be prevented from being erroneously loaded to recording/replaying means which are not meant for the cartridges, by means of judging whether or not the cartridge 1 has the identification information storer 4 before reading the identification information storer 4, and determining the transportation destination of the cartridge to either the first or second recording/replaying means, based on the judgment results.

Also, according to the above description, the cartridges are distinguished by whether the cartridges have identification information storers or not, but in the event that the cartridges have one of a plurality of identification information storers, the above description can be easily expanded to accommodate such. That is, an arrangement can be provided wherein identification is made regarding which of the plurality of identification information storers the cartridge has in addition to judgment of whether the cartridge has an identification information storer or not, and a plurality of reading means for reading the information recorded in the identification information storer of which the type has been identified are provided.

Embodiment

The following is an embodiment of the present invention applied to a tape library device which performs information management using tape cassettes, with reference to FIGS. 5 through 10.

Figure 5:
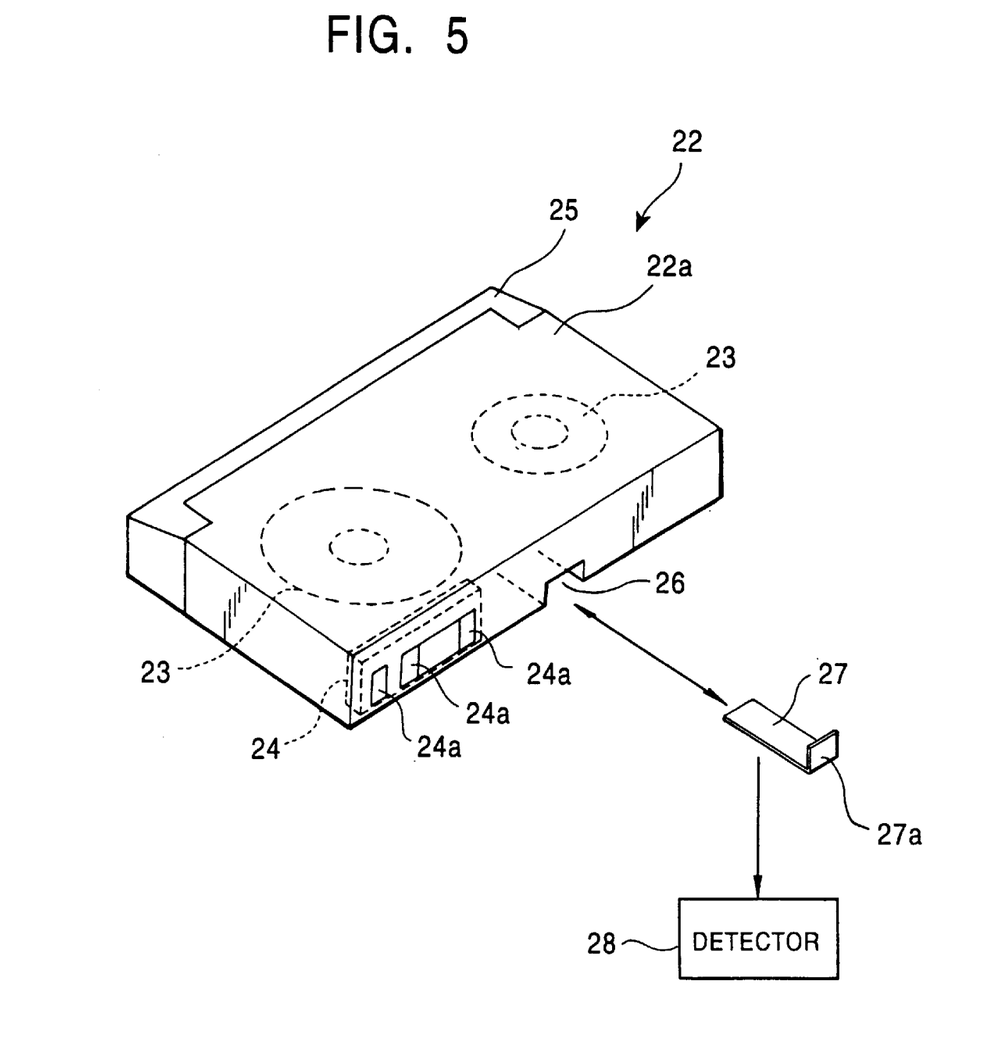
FIG. 5 is a diagram illustrating the present invention in conjunction with FIGS. 6 through 10, and is an explanatory diagram regarding identification information of the tape cassette.

FIG. 5 is an example of the construction of a tape cassette 22, with magnetic tape 23 serving as the recording medium being stored within the casing 22a by being wound onto unshown reels.

A memory IC (hereafter referred to as "MIC") 24 equivalent to the above-described identification information storer 4 is provided within the casing 22a of the tape cassette 22, with connection electrodes 24a, 24a, . . . for extracting the information stored within the MIC 24 exposed from the casing 22a. An arrangement can also be provided for wherein a slidable shutter member or cover member is provided for protecting the connection electrodes 24a of the MIC 24, in which case the connection electrodes 24a 24a, . . . are exposed only at the time of reading the stored information.

A notch 26 is formed on the base of the casing 22a (the side of the tape cassette 22 provided with a lid 25 being the front side thereof) extending backwards from a rearwards position and reaching the rear plane of the casing 22a, whereby presence or absence of the MIC 24 can be judged by presence or absence of the notch 26. That is, tape cassettes having the MIC 24 (hereafter referred to as "MIC cassettes") have the notch 26 formed therein, so in the case that the rear side of the tape cassette 22 is brought up to an L-shaped detecting member 27 lying on one side as shown in the Figure, the erected piece 27a of the detecting member 27 is received into the notch 26. Conversely, tape cassettes not having the MIC 24 (hereafter referred to as "non-MIC cassettes") do not have the notch 26 formed therein, so in the case that the rear side of the tape cassette 22 is brought up to an L-shaped detecting member 27 lying on one side, the erected piece 27a of the detecting member 27 comes into contact with the rear side of the tape cassette 22. Accordingly, judgment can be made whether or not the tape cassette 22 has an MIC 24 (i.e., these are equivalent to the above-described judger 5), by means of the detecting portion 28 detecting the relative position of the detecting member 27 to the rear side of the tape cassette 22. Of course, the present invention is by no means restricted to such a contact method; rather, non-contact methods may be used as well, such as optical judgment by judging the presence or absence of the notch 26 according to the presence or absence of reflected light therefrom.

Figure 6:
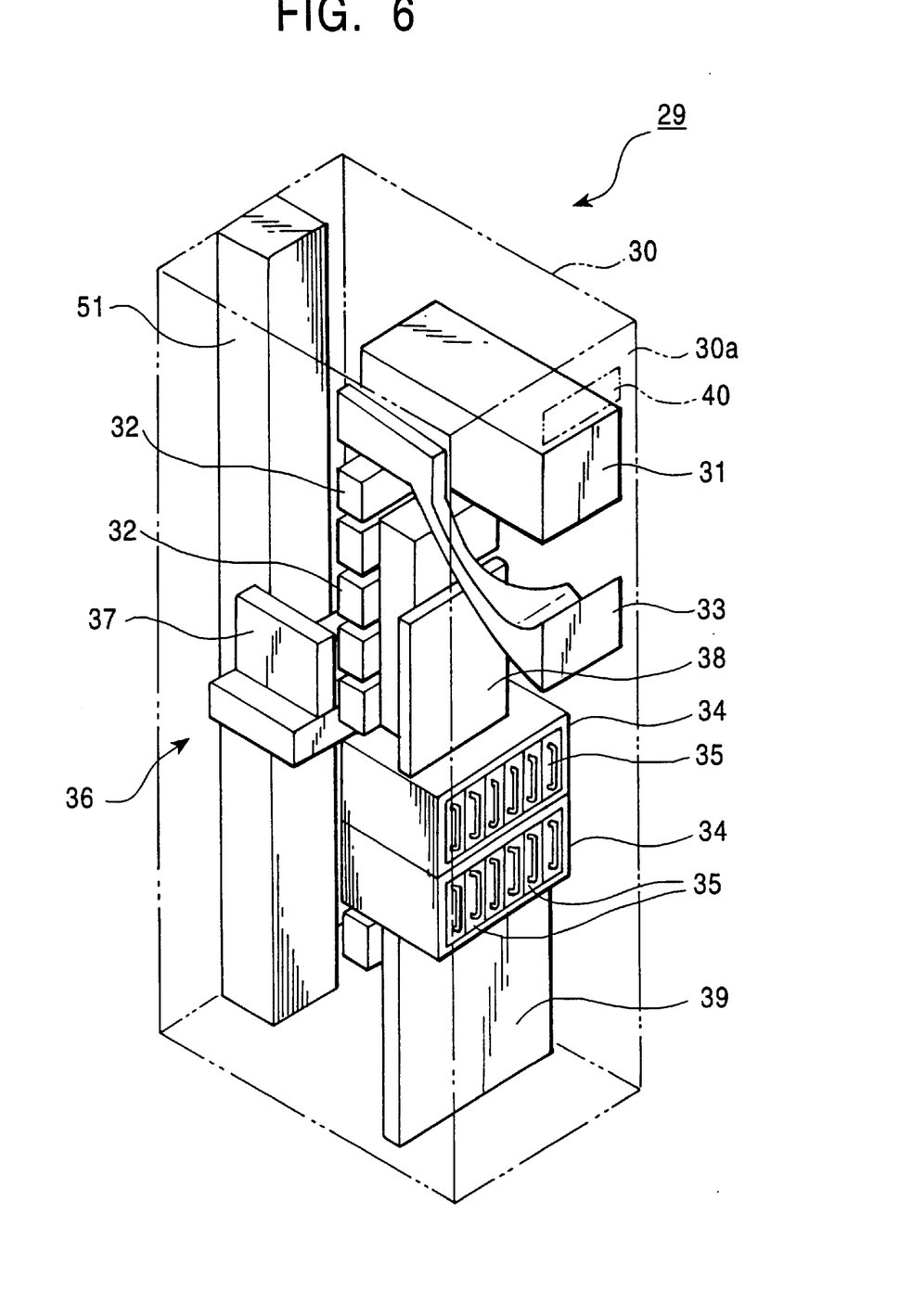
FIG. 6 is a perspective view illustrating the overview of a tape library device.

FIG. 6 is a conceptual representation of a tape library device 29, wherein tape cassettes (not shown) pass through a tape cassette supplying portion 31 provided on the front portion 30a of the casing 30 thereof and are stored in storage racks 32, 32, . . . (equivalent to the above-described storage portion 12) arrayed vertically therein at a portion somewhat above the middle area of the casing 30. Provided somewhat below the supplying portion 31 is an ejecting portion 33 for ejecting tape cassettes from the device, via a certain chute.

A plurality of tape drive units 35, 35, . . . equivalent to the above-described recording/replaying means 11 are stored in a horizontal array at the drive storage portions 34, 34 below the storage racks 32, 32, . . . .

Also, a transporting mechanism for extracting the desired tape cassette 22 from the storage rack 32 and transporting this cassette to the certain tape drive unit 35, and for performing reverse transpiration, is provided so as to oppose the storage rack 32 and storage portion 34, such as with a 3-dimension orthogonal robot, for example, or the like being used for the transporting mechanism 36. FIG. 6 also illustrates a hand block 37 of the transporting mechanism 36, and a movement mechanism relating to the vertical axis and horizontal axis.

Provided above the storage portions 34, 34 is a mechanical controller 38 for governing the control of the transporting mechanism 36, and provided below the storage portions 34, 34 is a system controller 39 serving as a control center.

A liquid crystal display 40 is provided somewhat above the supplying portion 31 on the front portion 30a of the casing 30, this being equivalent to the above-described display 16.

Figure 7:
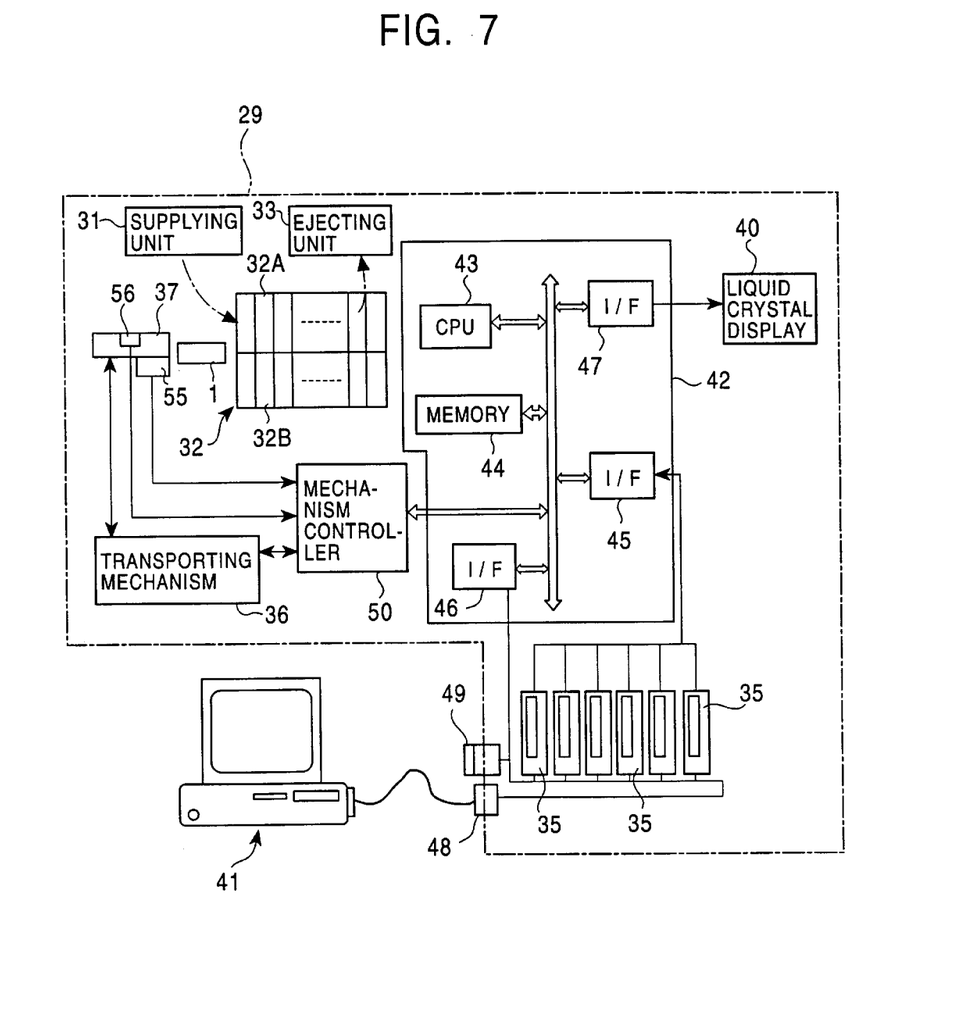
FIG. 7 is a block diagram illustrating the principal components of a tape library device and a host computer.

FIG. 7 illustrates the principal components within a tape library device 29 and a host computer 41, and a method wherein each of the tape drive units 35, 35, . . . and the library controller 42 are each provided with a separate SCSI (Small Computer System Interface) ID No. (the so-called multi-ID method) is employed.

The library controller 42 (included in the above system controller 39) within the tape library device 29 has therein a CPU (Central Processing Unit) 43, memory 44 including RAM (Random Access Memory) and ROM (Read-Only Memory), and interfaces 45, 46, and 47.

The plurality of tape drive units 35, 35, . . . are of a daisy-chain connection, and the tape library device 29 is provided with SCSI interface 48 for connection to the host computer 41, this being connected to the tape drive units 35, 35, . . . . The SCSI daisy-chain connection net is terminated by a terminator 49. In other words, transferring of data between the tape drive units 35 or host computer and the library controller 42 is performed via the SCSI interfaces 46 and 48, and confirmation of the presence or absence of tape cassettes within the tape drive units 35 and so forth is made with the library controller 42 via the interface 45.

A mechanism controller 50 (included in the above mechanical controller 38) handles control of the above transporting mechanism 36, and exchanges information with the library controller 42. The mechanism controller 50 and the library controller 42 are equivalent to the above-described controller 15.

The mechanism controller 50 performs actions such as controlling the hand block 37 of the transporting mechanism 36 so as to extract the tape cassette 22 from the supplying portion 31 and storing it in a certain place in the storage rack 32, extracting the tape cassette 22 from the storage rack 32 and loading it in a certain tape drive unit 35, or transporting the tape cassette 22 to the ejecting portion 33 and ejecting it therefrom.

Figure 8:
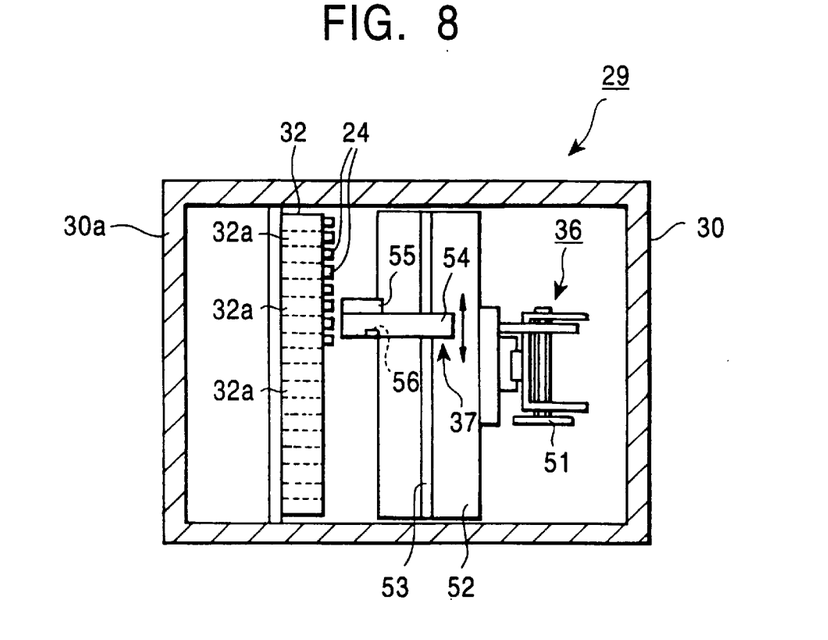
FIG. 8 is a horizontal cross-sectional view near the storage rack of the tape library device.

FIG. 8 is a schematic cross-sectional view of the tape library device cut away horizontally, wherein the transporting mechanism 36 is comprised of a supporting shaft 51 extending in a direction vertical to the paper (i.e., directly vertical) in FIG. 8, a moving table 52 moved in a vertical direction following the supporting shaft 51, and a hand block 37 sliding in a direction parallel to the storage plane of the storage rack following a guide rail 53 provided on the moving table 52.

The storage rack 32 is separated into a plurality of chambers 32a, 32a, . . . for individually storing the tape cassettes 22, and the portion of the stored tape cassettes 22 protruding from the storage rack 32 have the connecting terminals 24a, 24a, . . . of the aforementioned MICs exposed therefrom.

Also, an MIC reading terminal 56 is provided to the hand block 37, for reading the information stored in the MICs.

Figure 9:
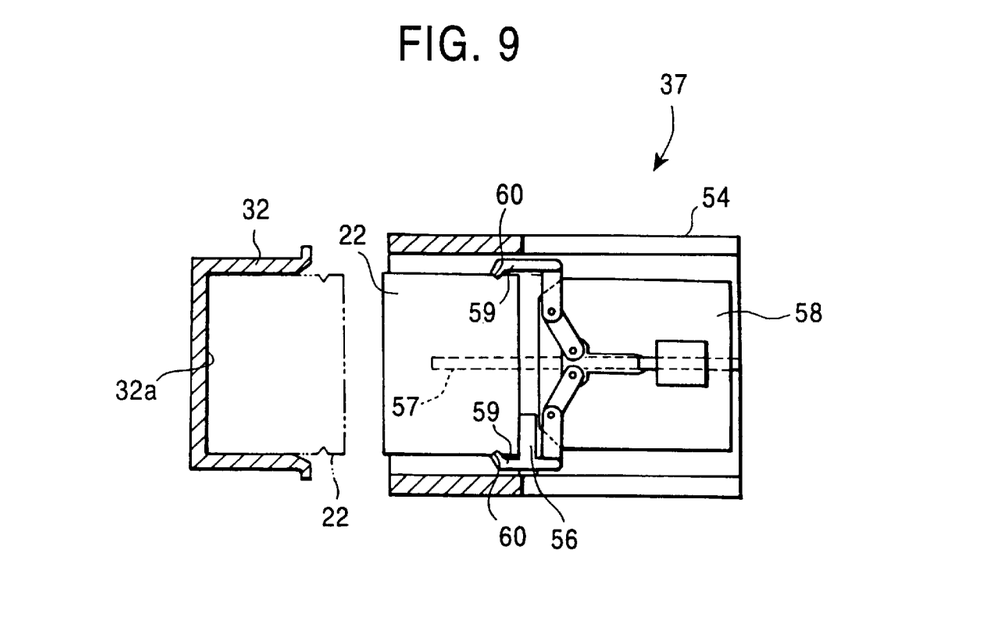
FIG. 9 is a schematic vertical cross-sectional view illustrating the state of extracting a tape cassette within the storage rack by means of a hand block comprising the transporting mechanism.

FIG. 9 is a schematic representation of a vertical cross-sectional view of the storage rack 32 and hand block 37, with a tape cassette 22 being drawn into the hand block 37.

The hand block 37 has a hand base 58 moved in a horizontal direction by unshown means following the guide rail 57 formed to the casing 54. The hand block 37 is provided with a hand chuck 59, and the orientation of the hand chuck 59 is controlled by an unshown mechanism so that the tip of the hand chuck 59 fits the recesses 60 and 60 formed to the side portion of the tape cassette 22 so as to grasp the tape cassette 22.

An MIC reading terminal 56 is provided to the casing 54 of the hand block 37 so as to correspond with the location of the connecting terminals of the MIC 24 of the tape cassette 22 which has been drawn in (in the present embodiment, the connecting terminals 24a, 24a, . . . are exposed to the rear side of the tape cassette 22), so that the MIC reading terminal 56 reads the identification information of the MIC 24 by coming into contact with the connecting terminals 24a, 24a, . . . of the MIC 24.

The information stored in the MIC 24 which has been read by the MIC reading terminal 56 is sent to the library controller 42 via the mechanism controller 50. The reason that the MIC reading terminal 56 has been provided to the hand block 37 is in order to allow for speedy reading of the identification information of the tape cassette 22 in the process of extracting the tape cassette 22 from the storage rack 32 and loading it to the tape drive unit 35, or in the process of storing the tape cassette 22 in the storage rack 32 from the above supplying portion 31. In other words, the reason that the MIC reading terminal 56 has been provided within the tape drive unit 35 is that time is required to transport the tape cassette 22 from the storage rack 32 or supplying portion 31 to the tape drive unit 35.

Although the judging sensor 55 for judging whether the tape cassette 22 is an MIC cassette or not (i.e., including the above detecting member 27 and detecting portion 28) can be either provided to the hand block 37 (See FIG. 8) or provided separately from the hand block, the mechanism controller 50 must control the judgment timing so that the judging sensor 55 can judge whether or not there is an MIC 24, before the information stored in the MIC 24 can be read by the MIC reading terminal 56. Incidentally, providing the judging sensor 55 to the hand block 37 allows for a more simple device configuration, in that movement means do not need to be provided separately for the judging sensor 55.

In the event that the tape cassette 22 is an MIC cassette, the MIC cassette is transported to and stored in the storage rack 32A (see FIG. 7) in the storage rack 32 for storing only MIC cassettes, and in the event that the tape cassette 22 is a non-MIC cassette, the non-MIC cassette is transported to and stored in the storage rack 32B for storing only non-MIC cassettes.

Incidentally, it is needless to say that, in the event that the tape cassette 22 is judged to be a non-MIC cassette, the tape cassette 22 may be immediately ejected from the apparatus without being stored in the storage rack 32B, or a display may be made on the liquid crystal display 40 from the library controller 42 via the interface 47 to the effect that the tape cassette 22 has been judged to be a non-MIC cassette.

Also, regarding the tape drive unit 35, two types of tape drive units, one dedicated to recording/replaying of MIC cassettes and the other dedicated to recording/replaying of non-MIC cassettes may be provided, so that the tape cassettes 22 are each judged and then transported to the respective tape drive units.

Figure 10:
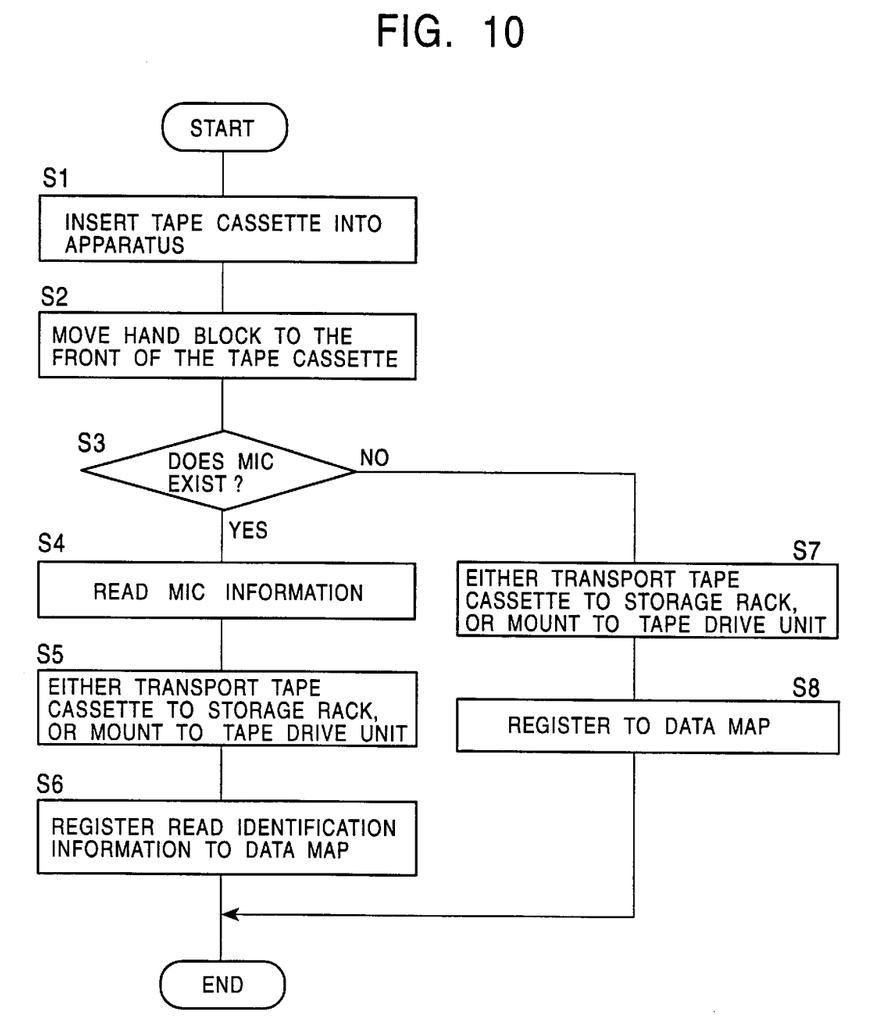
FIG. 10 is a flowchart illustrating the procedures relating to obtaining and storing identification information in the case of newly inserting a tape cassette regarding which identification information has not yet been recognized into the tape library device.

FIG. 10 is a flowchart illustrating the procedures in the case of newly inserting a tape cassette regarding which identification information has not yet been recognized, into the tape library device 29, and these processes being carried out by the mechanism controller 50 and the library controller 42.

First, in step S1, a new tape cassette is inserted into the supplying portion 31 of the tape library device 29. In the next step S2, the transporting mechanism 36 moves the hand block 37 so that the hand block 37 comes in front of the certain cassette, and the flow proceeds to the next step S3.

In step S3, the judging sensor 55 judges whether or not the cassette in question has an MIC or not; in the event that the cassette is an MIC cassette the flow proceeds to step S4, and in the event that the cassette is a non-MIC cassette the flow proceeds to step S7.

In step 4, the MIC reading terminal 56 reads the information stored in the MIC of the tape cassette, proceeds to the next step S5, and the device either transports and loads the tape cassette to the MIC cassette tape drive unit by means of the transporting mechanism 36, or stores the tape cassette to the MIC cassette tape storage rack 32A.

Then, in step S6, the information stored in the MIC 24 is registered in a certain data map. This data map is constructed using the above memory 44, and stores the information stored in the MIC 24 to addresses of shelf position numbers provided to each of the chambers 32a of the storage rack 32. In other words, the shelf position numbers represent the position at which the tape cassette is stored in the storage rack 32, and since there is no duplicating of numbers, the tape cassette at a position corresponding to the number and the MIC information thereof can be correlated in a one-on-one manner, thus enabling managing of tape cassette identification information. Non-volatile memory is used for the memory, or, in the event of using volatile memory, the data is compiled into a file and stored on fixed storage means such as a hard disk.

In the event that the flow reaches step S7, this is because judgment was made in step S3 that the cassette is a non-MIC cassette, and the device either transports and loads the tape cassette to the non-MIC cassette tape drive unit by means of the transporting mechanism 36, or stores the tape cassette in a certain position in the non-MIC cassette tape storage rack 32B. Then, in the next step S8, registration is made to a data map, but since there is no MIC identification information provided in this case, information indicating such or default information (certain information used in the event that there is no specification) is written to the data map.

Once the above work is completed for all unregistered tape cassettes, the data map is completed, and thus a tape cassette management database can be constructed.

Also, in the event that the tape cassette in question is to be ejected from the device due to the fact that it is a non-MIC cassette, instead of following the above steps S7 and S8, steps may be provided to display the fact that the tape cassette is a non-MIC cassette on the liquid crystal display 40, following which the tape cassette is transported to the ejecting portion 33 by the transporting mechanism 36 and ejected from the device.

Also, it is preferable to read the identification information of the tape cassettes within the storage rack and update the data map after the power switch to the tape library 29 is turned on, as well. The reason for this is that with an arrangement wherein the tape cassettes stored within the storage rack can be removed or replaced by human means (such as in cases wherein the storage rack is provided outside of the device, in cases wherein humans can enter the device, and so forth), the identification information of the tape cassettes stored in various positions in the storage rack may not meet the identification information which has already been registered to the data map. Such cases can be dealt with by, following the electric power of the data library device 29 being turned on in step S1 of FIG. 10, the judging sensor being moved in step S2 to the tape cassettes to judge whether each of the tape cassettes stored in the storage rack, and updating the data map in steps S6 and S8.

What is claimed is:

1. A recording/replaying apparatus, comprising:

judging means for judging whether a cartridge with a recording medium stored therein includes identification information storing means for storing identification information regarding said recording medium;

a supplier for supplying said cartridge from an exterior of said recording/replaying apparatus into said recording/replaying apparatus;

information reading means for reading said identification information of said identification information storing means;

first and second recording/replaying means for recording information to said recording medium of said cartridge and for replaying information from said recording medium of said cartridge, wherein said first recording/replaying means includes information reading means for reading said identification information and said second recording/replaying means does not include said information reading means; and control means for controlling an operation of said recording/replaying means, wherein said judging means judges whether said cartridge includes said identification information storing means partway through a path formed between said information reading means and said supplier, and said control means performs a control based on judgement results of said judging means so that when said cartridge includes said identification information storing means, said control means controls said supplier to move the cartridge to said first recording/replaying means, and when said cartridge does not include said identification information storing means, said control means controls said supplier to move the cartridge to said second recording/replaying means.

2. The recording/replaying apparatus according to claim 1, wherein when said cartridge does not include said identification information storing means, said control means ejects said cartridge from said recording/replaying apparatus.

3. The recording/replaying apparatus according to claim 1, further comprising display means for displaying whether said cartridge includes said identification information storing means, wherein said control means displays whether said cartridge includes said identification information storing means on said display means based on said judgement results of said judging means.

4. An information managing apparatus for replaying information requested by a command from an external command device from a recording medium within one of a plurality of cartridges and provided to said external command device and for recording information to said recording medium within said one of said plurality of cartridges according to a command from said external command device, said information managing apparatus comprising:

a storage group for storing a plurality of cartridges;

judging means for judging whether said one of said plurality of cartridges with said recording medium stored therein includes identification information storing means for storing identification information storing means for storing identification information regarding said recording medium;

a supplier for supplying said one of said plurality of cartridges from an exterior of said information managing apparatus into said information managing apparatus;

information reading means for reading said identification information of said identification information storing means;

recording/replaying means for recording information to said recording medium of said one of said plurality of cartridges and for replaying information from said recording medium of said one of said plurality of cartridges;

control for controlling an operation of said recording/replaying means; and transporting means for transporting said one of said plurality of cartridges between said storage group and said recording/replaying means, wherein said judging means whether said one of said plurality of cartridges includes said identification information storing means partway through a path formed between said information reading means and said supplier, and said control means performs a control based on judgement results of said judging means so that said information reading means only reads said identification information when said one of said plurality of cartridges includes said identification information storing means wherein said recording/replay means includes first recording/replaying means having said information reading means, and second recording/replaying means not having said information reading means, when said one of said plurality of cartridges includes said identification information storing means, said control means controls said transporting means to move said one of said plurality of cartridges to said first recording/replaying means, and when said one of said plurality of cartridges does not include said identification information storing means, said control means controls said transporting to move said one of said plurality of cartridges to said second recording/replaying means.

5. The information managing apparatus according to claim 4, wherein when said cartridge does not include said identification information storing means, said control means controls said transporting means to eject said one of said plurality of cartridges from said information managing apparatus.

6. The information managing apparatus according to claim 4, further comprising display means for displaying whether said one of said plurality of cartridges includes said identification information storing means, wherein said control means displays whether said one of said plurality of cartridges includes said identification information storing means on said display means based on said judgement results of said judging means.

7. The information managing apparatus according to claim 4, wherein said storage group comprises at least a first storage group and a second storage group, when said one of said plurality of cartridges includes said identification information storing means, said control means controls said transporting means to move and store said one of said plurality of cartridges to said first storage group, and when said one of said plurality of cartridges does not include said identification information storing means, said control means controls said transporting means to move and store said one of said plurality of cartridges to said second storage group.

* * * * *